(12) United States Patent
Ammar

(10) Patent No.: US 12,630,242 B2
(45) Date of Patent: May 19, 2026

(54) APPARATUS AND METHODS FOR A SPHERICAL ASSEMBLY

(71) Applicant: Essam Abdelrahman Ammar, Chicago, IL (US)

(72) Inventor: Essam Abdelrahman Ammar, Chicago, IL (US)

( * ) Notice: Subject to any disclaimer, the term of this patent is extended or adjusted under 35 U.S.C. 154(b) by 621 days.

(21) Appl. No.: 18/100,946

(22) Filed: Jan. 24, 2023

(65) Prior Publication Data

US 2023/0234659 A1 Jul. 27, 2023

Related U.S. Application Data

(60) Provisional application No. 63/302,775, filed on Jan. 25, 2022.

(51) Int. Cl.
| | |
|---|---|
| *B60K 1/02* | (2006.01) |
| *B62D 63/04* | (2006.01) |
| *H02K 5/24* | (2006.01) |
| *H02K 21/24* | (2006.01) |

(52) U.S. Cl.
CPC ............... *B62D 63/04* (2013.01); *B60K 1/02* (2013.01); *H02K 5/24* (2013.01); *H02K 21/24* (2013.01)

(58) Field of Classification Search
CPC . B62D 63/04; B60K 1/02; B60K 7/00; B60K 7/0007; B60K 2007/003; B60K 2007/0038; B60K 2007/0053; H02K 5/24; H02K 21/24; H02K 53/00; F03G 7/125; F03G 3/087; B60B 19/00; B60B 19/14; B60B 19/003
USPC ...................................................... 180/65.51
See application file for complete search history.

(56) References Cited

U.S. PATENT DOCUMENTS

| | | | | | |
|---|---|---|---|---|---|
| 4,926,107 | A | * | 5/1990 | Pinson | .................. H02J 15/007 |
| | | | | | 310/74 |
| 6,289,263 | B1 | | 9/2001 | Mukherjee | |
| 6,851,496 | B2 | * | 2/2005 | Prucher | .................... H02K 7/14 |
| | | | | | 180/65.1 |

(Continued)

FOREIGN PATENT DOCUMENTS

| | | | |
|---|---|---|---|
| WO | WO 2019/173156 A1 | 9/2019 | |
| WO | WO-2020232066 A1 * | 11/2020 | ............. F03G 7/125 |

OTHER PUBLICATIONS

International Search Report and Written Opinion for PCT Application No. PCT/US2023/011461 dated Jun. 22, 2023.

*Primary Examiner* — James A Shriver, II
*Assistant Examiner* — Hilary L Johns
(74) *Attorney, Agent, or Firm* — Duane Morris LLP

(57) ABSTRACT

This disclosure relates generally to vehicles propulsion based on the use of natural gravitational forces and, in some instances, the use of electric motor control. In some examples, a spherical assembly includes a spherical encasing a first motor connected to a first weight, a second motor connected to a second weight, and a power generator configured to supply power to the first motor and to the second motor. The spherical assembly may also include a controller that is configured to cause the first motor to rotate the first weight in a first direction at a first rotational speed and the second motor to rotate the second weight in a second direction at a second rotational speed based on the rotational speed of the spherical assembly. The controller may also be configured to cause the power generator to generate power for the first motor and the second motor.

20 Claims, 12 Drawing Sheets

(56) References Cited

U.S. PATENT DOCUMENTS

| | | | |
|---|---|---|---|
| 10,308,134 B2 | 6/2019 | Fontaine et al. | |
| 10,315,460 B1 | 6/2019 | Ammar | |
| 10,518,628 B2 * | 12/2019 | Ammar | B60B 19/003 |
| 10,734,878 B2 | 8/2020 | Kim et al. | |
| 2003/0010550 A1 * | 1/2003 | Prucher | F16C 32/04 |
| | | | 180/65.51 |
| 2015/0123451 A1 | 5/2015 | Nelson | |
| 2019/0275879 A1 * | 9/2019 | Ammar | B60K 7/0007 |

* cited by examiner

SECTION Y-Y

SECTION Y-Y

SECTION Y-Y

SECTION Y-Y

APPARATUS AND METHODS FOR A SPHERICAL ASSEMBLY

CROSS-REFERENCE TO RELATED APPLICATIONS

This application claims priority to U.S. Provisional Application Ser. No. 63/302,775, filed on Jan. 25, 2022 and entitled "APPARATUS AND METHODS FOR A SPHERICAL ASSEMBLY," which is hereby incorporated by reference in its entirety.

FIELD

This disclosure relates generally to propulsion and, more specifically, to vehicle drive systems and corresponding methods of propulsion.

BACKGROUND

Today's transport vehicles include vehicle drive systems that are powered typically by either internal combustion engines, electric motors, or, in some cases, a hybrid of both, which provide power for vehicle propulsion. These vehicles are also equipped with steering mechanisms and manually or automatically controlled gearboxes. These steering mechanisms allow for the control of vehicle travel direction, while the gearboxes facilitate vehicle torque and speed. To change travel direction, however, the vehicles require a circular area in which to execute the turn, also known as a turning radius.

To propel in a given direction, today's vehicles depend on the horizontal reacting force of friction between the vehicle's tires and the surface of travel (e.g., the road). The force of friction is based on a coefficient of friction and the vertical force of the vehicle's weight at the point of contact between the vehicle's tires and the surface of travel. As such, the tires provide a horizontal force that is reacted to by an equal horizontal force in the opposite direction due to the friction. If the force of friction is less, slippage between the tire and surface of travel will occur, as may occur on icy or muddy surfaces, where the coefficient of friction between the vehicle's tires and the icy or muddy surface may be less than the coefficient of friction between the vehicle's tires on a dry surface. When slippage occurs, not only does the vehicle fail to propel as expected, the vehicle can lose control of its travel direction, and can also lose energy due to the slippage rather than using it to propel. Accordingly, there are opportunities to improve today's vehicle drive systems.

SUMMARY

This disclosure relates generally to vehicles propulsion based on the use of natural gravitational forces and, in some instances, the use of electric motor control to assist in propelling vehicles. The vehicles may be propelled on the ground, on water, and in air as well as space by creating linear centrifugal forces. In some examples, the spherical assemblies described herein can provide a green (e.g., electric) replacement to jet propulsion for commercial and military aircrafts, as well as in space with, for example, the use of solar panels providing a source of energy to power electric motors, and without the need to carry exhausted fuel.

These disclosures provide apparatus and methods that allow for, among other things, one or more of the following:

1) Control and efficient manipulation of the naturally constant vertical earth gravity forces acting on oppositely rotating unbalancing weights that can propel vehicles, such as vehicles on the ground, by using a motor generator set attached to an inner assembly frame and to a stationary outer enclosure.

2) Employ an oppositely rotating weights configuration to eliminate any spiral propulsion created when otherwise the rotating speed of the weights starts to be high enough for creating radial centrifugal forces to prevail over the natural vertical gravitational forces.

3) Rotate an inner assembly as described herein to propel vehicles on the ground, in the water, air, or space, using, in some examples, one or more variable speed reversible electric motors attached to the inner assembly frame and to the stationary outer enclosure.

4) Employ rotating weights in a configuration such that all resultant radial centrifugal forces pass through the geometric center of the spherical assembly. The centerline of the inner assembly's motor generator and/or motor of this disclosure may pass through the geometric center of the spherical assembly.

5) Provide a wired and/or wireless electric power and control to sources and instruments located in the propelled vehicle outside of the propelling spherical assemblies. In some examples, the electric power and control is provided entirely with wired connections, thereby eliminating all power and control wireless transmission.

6) The embodiments may employ fixed stationary parts where electric power and control wiring and all other ancillaries like vacuum pump and lubricants cooling systems inlets and outlets can be safely connected. The creation of those fixed parts can limit the steering of the propelling forces to only 2-D without changing the orientation of the propelled vehicle. Also, methods are provided to eliminate the tendency of those fixed parts together with the propelled vehicle itself to rotate by the inner assembly's rotating motor or the motor generator set.

7) Provide methods to eliminate vibrations created in the process of converting radial centrifugal forces of rotating weights to usable linear forces to propel vehicles.

Advantages of these disclosures will be readily apparent to one skilled in the art to whom the disclosures are provided at least from a perusal of the claims, the appended drawings, and the following detail description of the embodiments.

DETAILED DESCRIPTION

Figure 1:
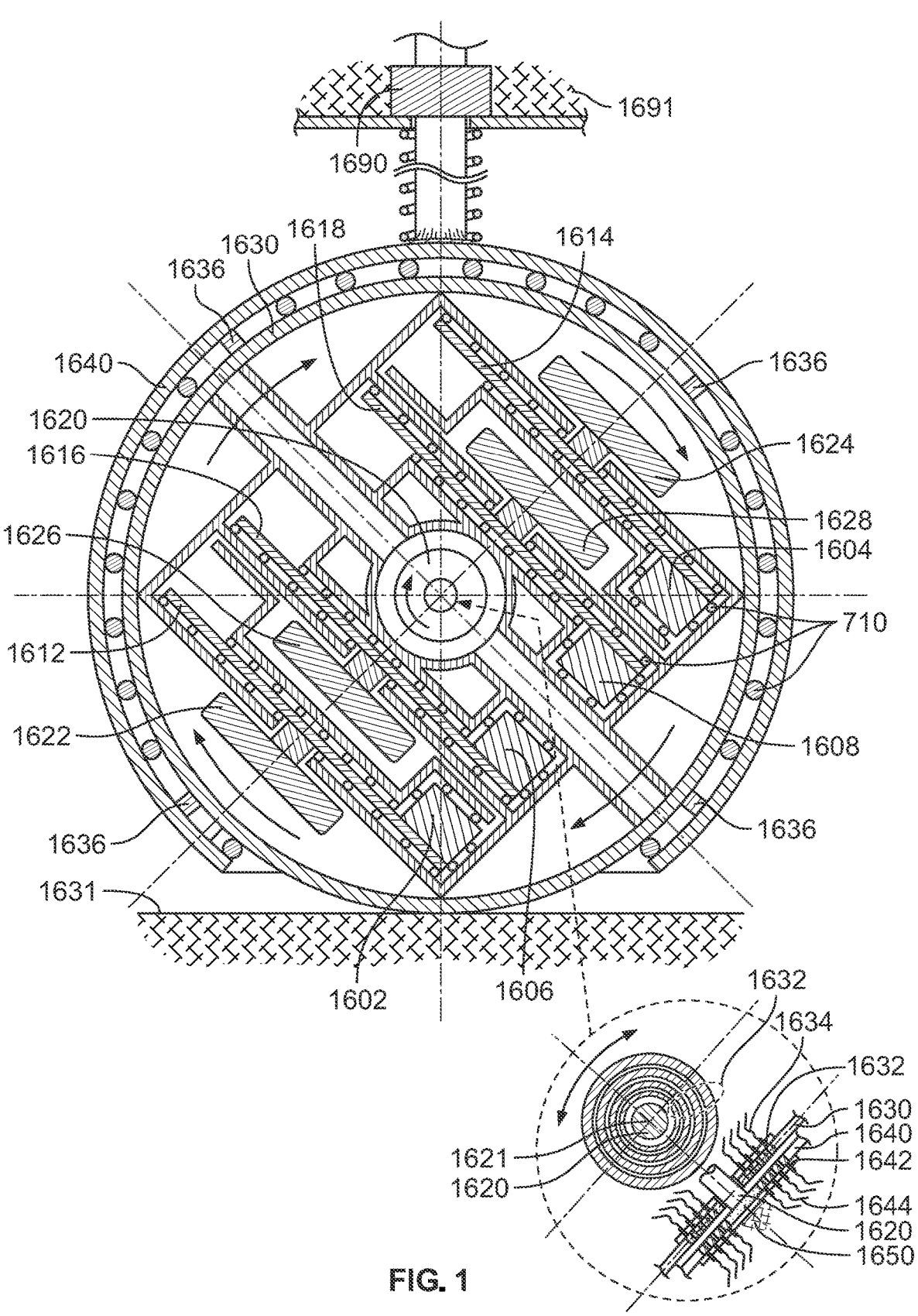
FIG. 1 illustrates a noiseless, vibration-less and wired electric spherical assembly.

While the present disclosure is susceptible to various modifications and alternative forms, specific embodiments have been shown by way of example in the drawings and will be described in detail herein. The objectives and advantages of the claimed subject matter will become more apparent from the following detailed description of the preferred embodiments thereof in connection with the accompanying drawings. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

The apparatus and methods described herein may maintain a stationary state of an outer enclosure in spite of a shaft of motors rotating inner assemblies. In addition, the apparatus and methods may simultaneously eliminate all unopposed vibration causing forces resulted during the conversion process of the generated radial centrifugal forces to controlled propelling linear forces in magnitude and direction. As described, in some instances, one pair of spherical inner assemblies in an outer enclosure is sufficient to achieve the above noted objectives when a propelling direction is perpendicular to an imaginary plane containing both centerlines around which each of the inner assemblies rotates, as described herein.

In some embodiments, the propelled vehicle's relatively low travel speed on the ground is attained by the naturally constant vertical gravitational forces acting on oppositely rotating weights of constant selected radius when they always coincide within the forward half of the spherical assembly in spite of its rotation. In some embodiments, additional means are employed to: provide for higher travel (rotating) speeds; and, provide for controlled speeds less than what the constant gravitational forces provide.

In some examples, a "motor generator" is employed to provide for higher rotating speeds, at the selected radius of the unbalancing weights rotation, than what the gravitational forces can provide. The higher rotating speeds can still be limited to up to those that create prevailing centrifugal forces.

The motor generator may also provide reliable manipulation and control of rotating speeds less than what the constant gravitational forces provide by generating electric power to charge its power source. It can act as a braking load reducing the available acceleration of gravity.

In addition, the motor generator can provide propulsion at higher efficiency and longer range of travel than without its use. The larger the radius of the spherical assembly the more efficient the propulsion may be and/or the higher the maximum travel speed that may be attained.

The motor generator can be located such that its stationary (normally rotating) shaft centerline coincides with the axis of rotation of the inner assembly (X) passing through the geometric center of the spherical assembly and solidly affixed to the stationary outer enclosure. Its rotating (normally stationary) stator, is solidly attached to the inner assembly's frame and rotating it.

The disclosures include a means to counter act a tendency to rotate the stationary outer enclosure of the assembly and the propelled vehicle to which it is attached. In some instances, the motor generator can be located outside of, and its stators affixed to, the stationary spherical outer enclosure. The motor generator shaft axis can be positioned to coincide with and affixed to the spherical inner assembly axis of rotation providing the power to rotate it.

The vehicle's travel speed (which may be travelling on the ground, in water, in air, and/or space) may be attained at least by converting created radial centrifugal forces of rotating weights to linear propelling forces by the combined rotation of oppositely rotating weights and a rotation of the spherical inner assembly holding them such that the weights stay in the forward half of the sphere in spite of its rotation. The weights configuration can be such that the created radial forces of the oppositely rotating weights passes through the spherical assembly's geometric centerline.

The conversion process produces vibrating forces without any remedies within the spherical assembly itself. A combined second spherical assembly with its inner assembly rotation is configured lagging behind the first one by a quarter of a cycle at the same speed shall eliminate (cancel) the vibration and in a direction to counter the tendency to rotate the outer assembly enclosure.

In one revolution of oppositely rotating weights, the weights will coincide twice producing maximum and full useful propelling linear forces in the travel direction along the Z axis. They will oppose each other twice eliminating most if not all created centrifugal forces along the X axis. In between, however, four times every revolution, the created radial centrifugal forces along the Z axis may have varying components of useful propelling linear forces in the direction of travel, second components oppose and cancel each other along the X axis, and third unopposed components perpendicular to both the travel direction and the X axis which may produce vibrations.

This disclosure provides for clusters of spherical assemblies with specificities of their inner assemblies and weights directions of rotation resulting in total cancellation of these vibrations causing forces (e.g., as shown and described with respect to FIG. 2 through FIG. 6).

The arrangement of the spherical assemblies and their rotating directions with respect to each other within a cluster can also, at the same time, counteract the tendency of the inner assembly rotating motor shaft to rotate the stationary outer enclosure and possibly the vehicle to which it is attached. It can provide reliably fixed outer enclosure.

The fixation of the outer enclosure allows for the implementation of the wired disclosure and at the same time maintains inside a vacuum to reduce heat of air friction. The area surrounding the inner assembly's shaft connection to the outer enclosure provides a suitable area for all connections to and from the assembly.

The requirement of multi spherical assemblies in one apparatus to eliminate vibration and provide stationary state of the outer assemblies enclosure fits well with the need for modular design of the propelling spherical assemblies due to the strength of material limitation at high tip speed of rotating bodies at high speeds and long radii.

To provide a feel for the magnitude of a spherical assembly's created linear forces as described herein, and assuming its unbalancing weights' centers of gravity (CG) is rotating in ½ meter radius at 100,000 rpm, the spherical assembly can produce radial centrifugal acceleration of about 55,000,000 m/s² and can convert it to linear acceleration of about 22,000,000 m/s² assuming 40% conversion efficiency. That is approximately 2,000,000 times the acceleration of the earth gravity. The centrifugal acceleration is known to be directly related to the rotating radius and to the square of its rotating speed in radians.

Referring to the figures, FIG. 1 illustrates an embodiment of a wired electric power and control spherical assembly 1600 where a spherical inner assembly 1630 is in touch with the ground surface 1631. In this example, the wired electric power and control spherical assembly 1600 further includes a circular insulated electric conductor 1632 attached to the rotating inner assembly frame 1630. Further, a stationary outer assembly enclosure 1640 includes contacts 1642, which contact circular insulated electric conductor 1632. Further, the wired electric power and control spherical assembly 1600 includes a motor 1620, including a stationary shaft 1621 (e.g., located along the X-axis), where, at least in some examples, connections for vacuum pumps and lubricating oil cooler/filter can be positioned and/or connected.

Control spherical assembly 1600 can propel vehicles on the ground at relatively low rotating speeds in the range from standstill up to but not more than speeds that create any prevailing centrifugal forces. Propulsion is provided by the naturally constant vertical gravitational forces acting on oppositely rotating weights. For example, weights 1602 and 1604 rotate in one direction, and weights 1606 and 1608 rotate in a different direction. The spherical inner assembly 1630 rotates around a stationary horizontal X axis by the naturally constant and vertical gravitational forces acting on its weights 1602 and 1604 and on the oppositely rotating weights 1606 and 1608. Each weight rotates by its own reversible variable speed electric motor 1622, 1624, 1626 and 1628 respectively (axial flux type is shown). The weights rotate at controlled speed that always follow and match that of the inner assembly.

The configuration of the inner assembly and all its weights and their combined rotation can be such that the oppositely rotating weights' centers of gravity tend to (e.g., always) coincide in a forward half (e.g., with respect to the direction of travel) of the spherical assembly 1600. Circular plates 1612, 1614, 1616 and 1618 can connect each weight to its rotating motor shaft respectively.

All rotating parts within the inner assembly can have friction reducers 710 ball bearings in lubricants. Lubricant pump (not shown), located between the inner assembly and the outer enclosure and attached to the stationary shaft of the motor generator 1620 can have its lubricant inlet and outlet to an outside lubricant cooler/filter in the centerline X axis 1621.

A motor generator 1620 is attached to the inner assembly frame such that its stationary shaft (normally rotating) centerline lie along the X axis passing thru the geometric center of the spherical assembly and fixed to the outer partial enclosure 1640. Its rotating stator (normally stationary) is fixed to the inner assembly frame. It can operate as a motor, only when higher rotating speed than what the acceleration of gravity can provide, is desired but is limited to when the weights rotating speed start to generate prevailing centrifugal forces. It can operate as a generator to reduce and control the constant inner assembly rotating speed dictated by the constant gravitational force. The generator can charge the electric power source, increase the vehicle travel range and improve efficiency by harvesting the unused power of gravity.

The stationary outer partial enclosure 1640 holding the inner assembly can be perforated with framed tracks holding oversized ball bearings between it and the spherical outer surface of the inner assembly. It can be connected to the propelled vehicle by center rod free to move vertically thru spring and shock absorber. It can be connected to an electric servo motor to steer the spherical assembly horizontally for sharp turns. Momentary difference between the rotating speed of the oppositely rotating weights can create soft horizontal turns. Momentary difference between the rotating speed of all the weights and that of the inner assembly will reduce the arm length of the propelling torque created by the falling weights from maximum to zero then move the torque to the back half of the assembly from zero to maximum propelling the vehicle in the opposite direction. An advantage feature to reduce the length of the skid distance of a high speed travelling vehicle upon mechanical breaking to stop.

Pressure sensors/mechanical breaks 1636 can be located between the inner assembly 1630 and its partial outer enclosure 1640 and can provide steering feedback control signals.

Electric power and control wiring 1644 from power sources and control instruments located in area designated 1650 as close as possible to the X axis and in constant contact with circular conductors 1632 embedded in the rotating inner assembly 1630 surface and connected to the wiring 1634 serving the inner assembly motors' electric power and control needs.

Figure 2:
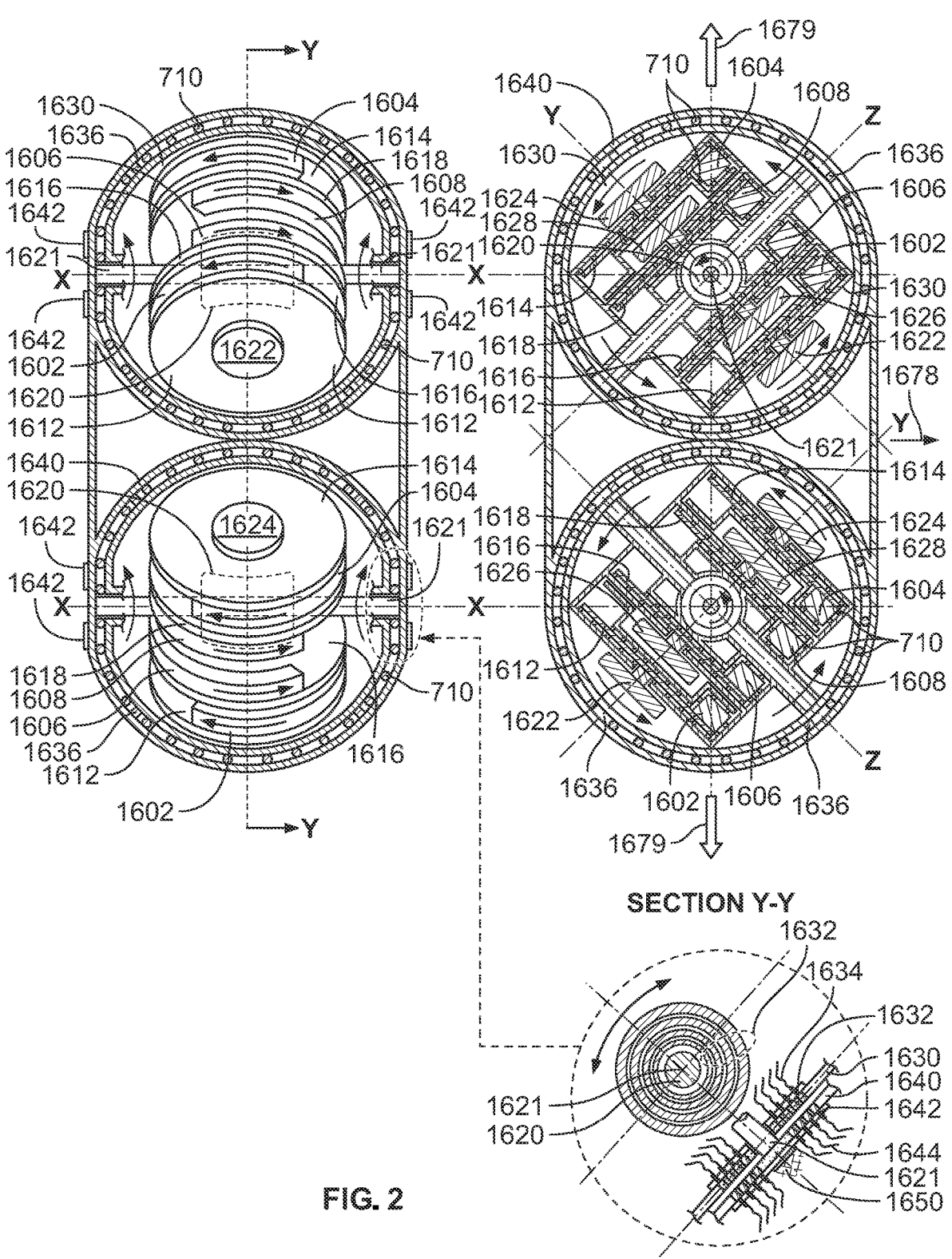
FIGS. 2 and 2A illustrate a noiseless, vibration-less, and wired electric pair of spherical inner assemblies in a stationary and sealed under vacuum outer enclosure.

FIG. 2 illustrates an embodiment of two, totally wired electric power and controlled spherical assemblies where radial centrifugal forces are created and converted into linear controlled forces to propel vehicles in any medium (air, water or space) at any direction. Propulsion is strictly by linear forces converted from generated radial centrifugal forces. The spherical assemblies can rotate at relatively high speeds, thereby propelling vehicles on the ground, on the water, in air, or space.

The radial centrifugal acceleration is known to be directly related to the radius of rotating object and to the square of its rotating speed in radians. The longer a rotating radius, the higher the speed of rotation. However, the long radius has its tip speed limitations and the very high rotating speed is also limited by the heat generated due to air friction. A shorter radius of multiple assemblies for the same output and enclosed in a totally sealed outer enclosure 1640 under perfect vacuum may overcome both problems.

In the process of converting radial to linear centrifugal forces, multiple assemblies can also be employed to eliminate all unopposed components of the radial centrifugal forces that are not in the direction of propulsion and can cause vibrations as shown in FIGS. 2A, 3, 3A, 4, 4A, 5, 5A, 6, and 6A.

Figure 2A:
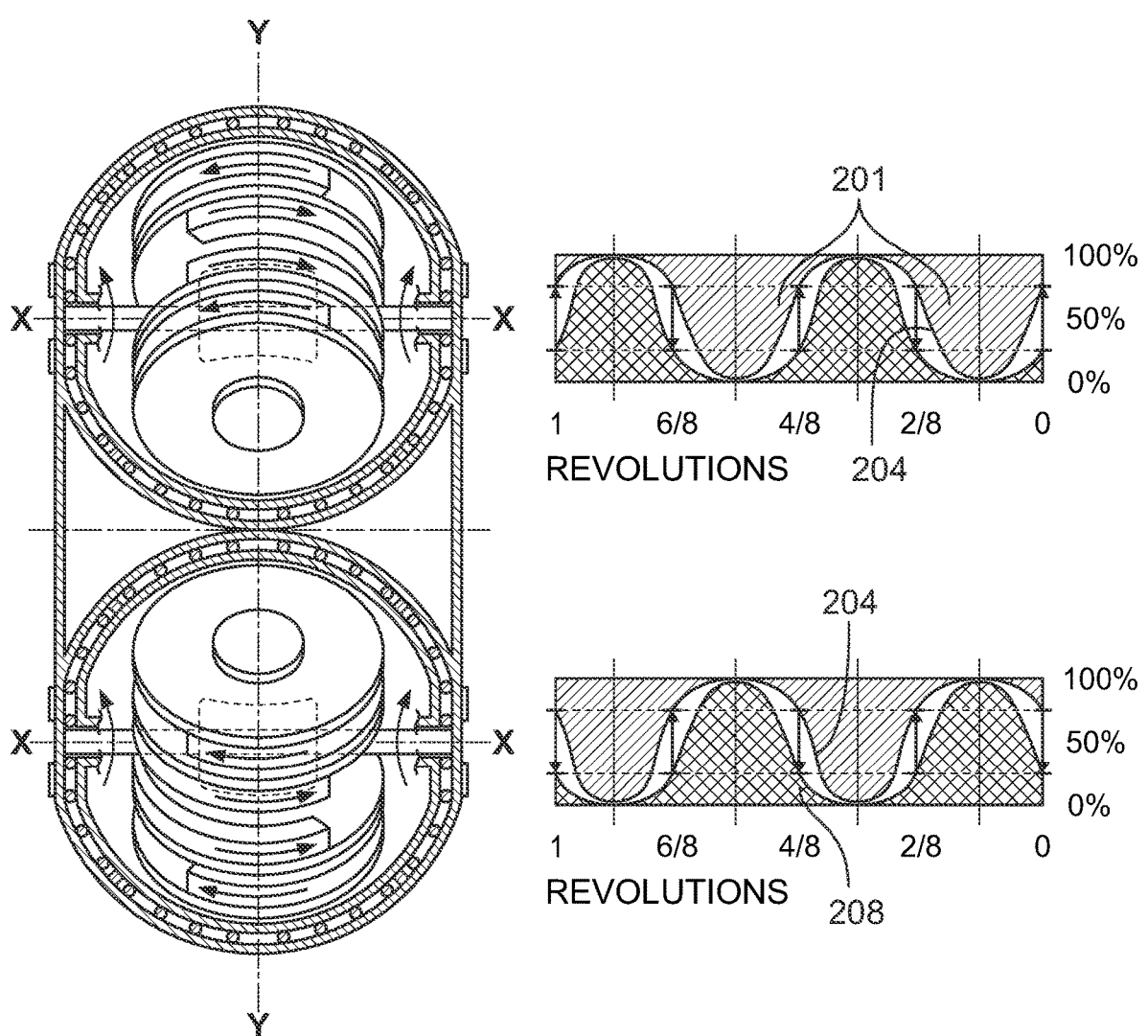
Figure 3:
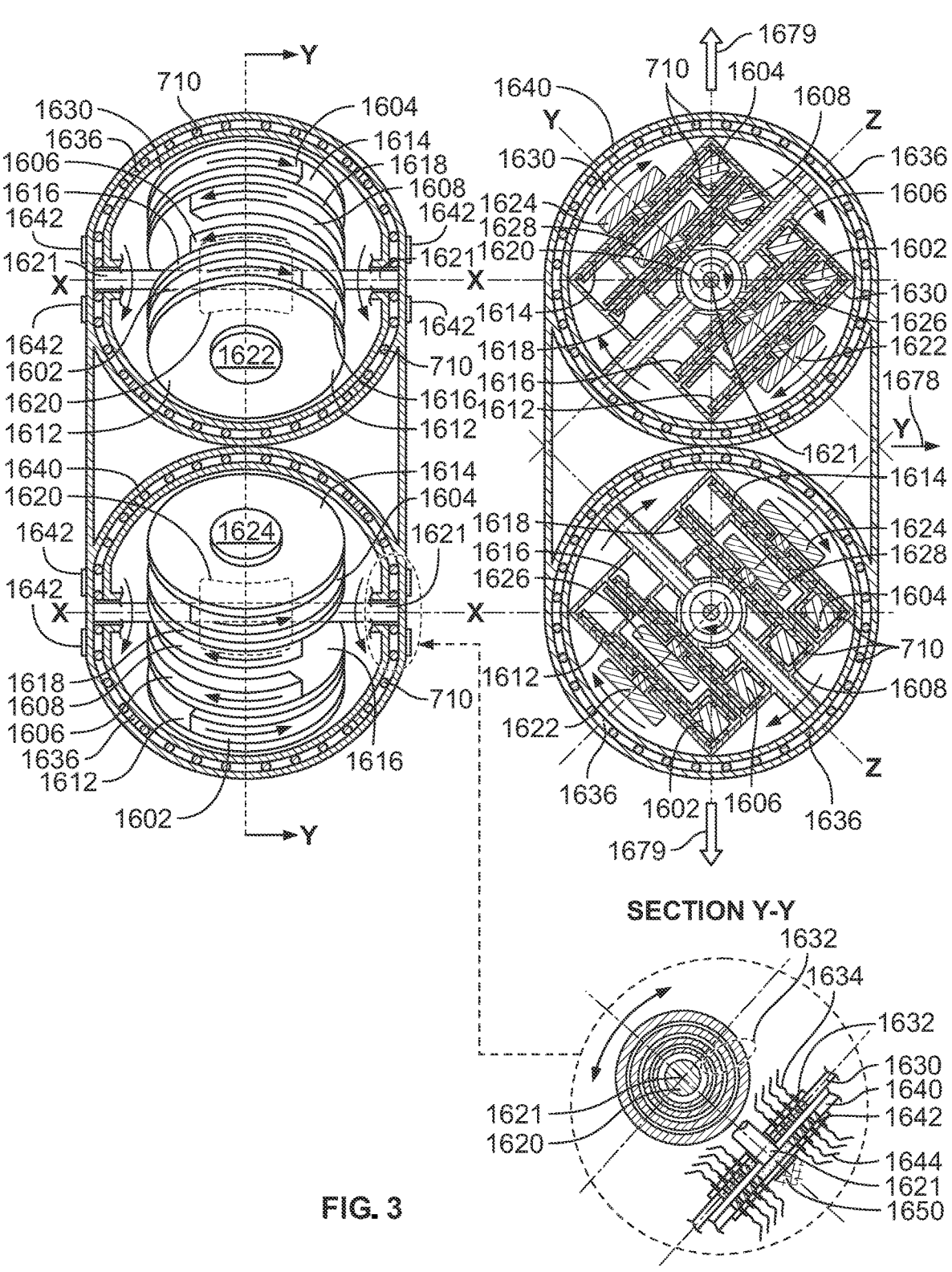
FIGS. 3 and 3A illustrate the pair of spherical inner assemblies of FIGS. 2 and 2A but with an alternate rotations scheme of its inner assemblies and its weights to achieve similar results.
Figure 3A:
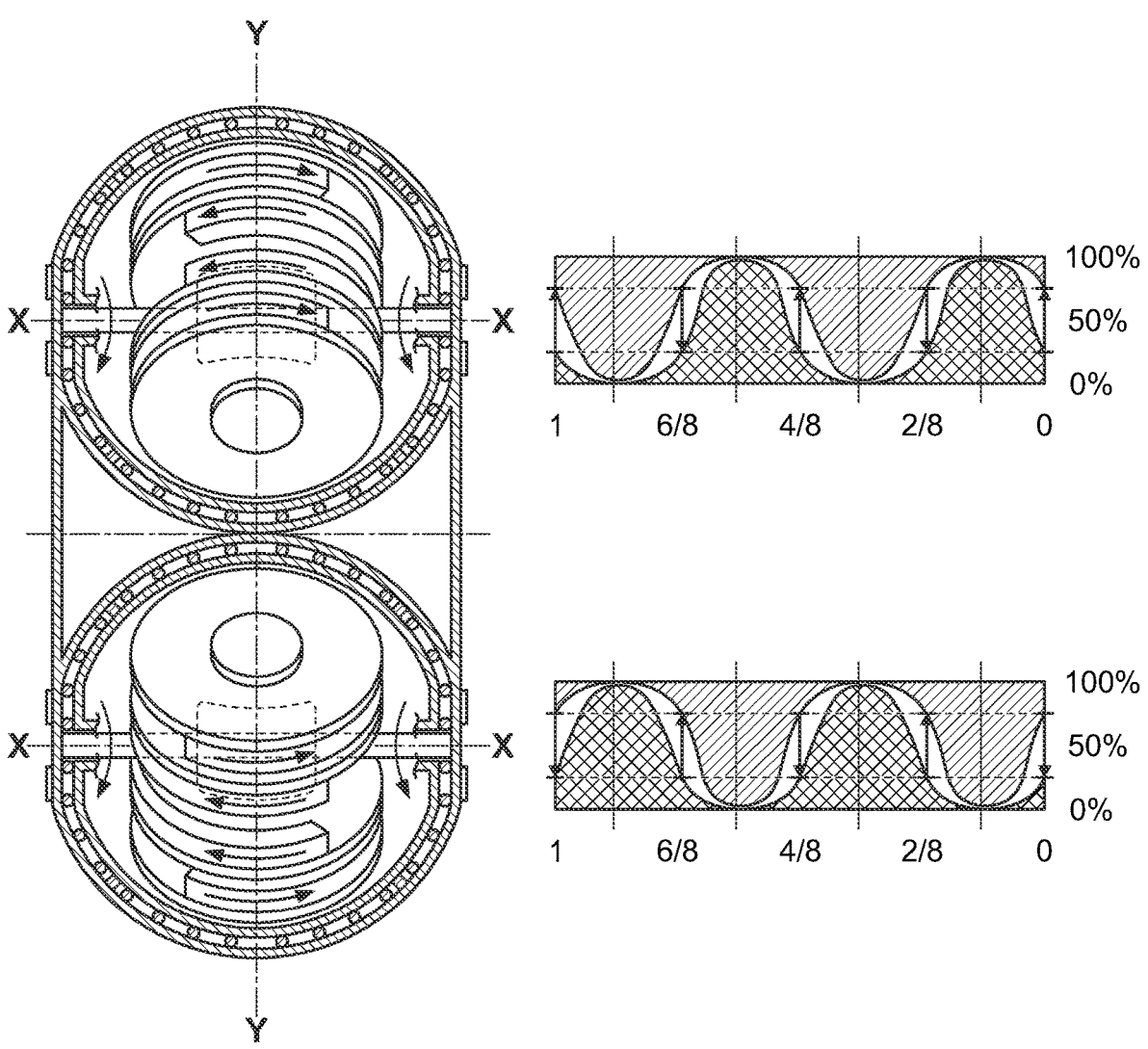
Figure 4:
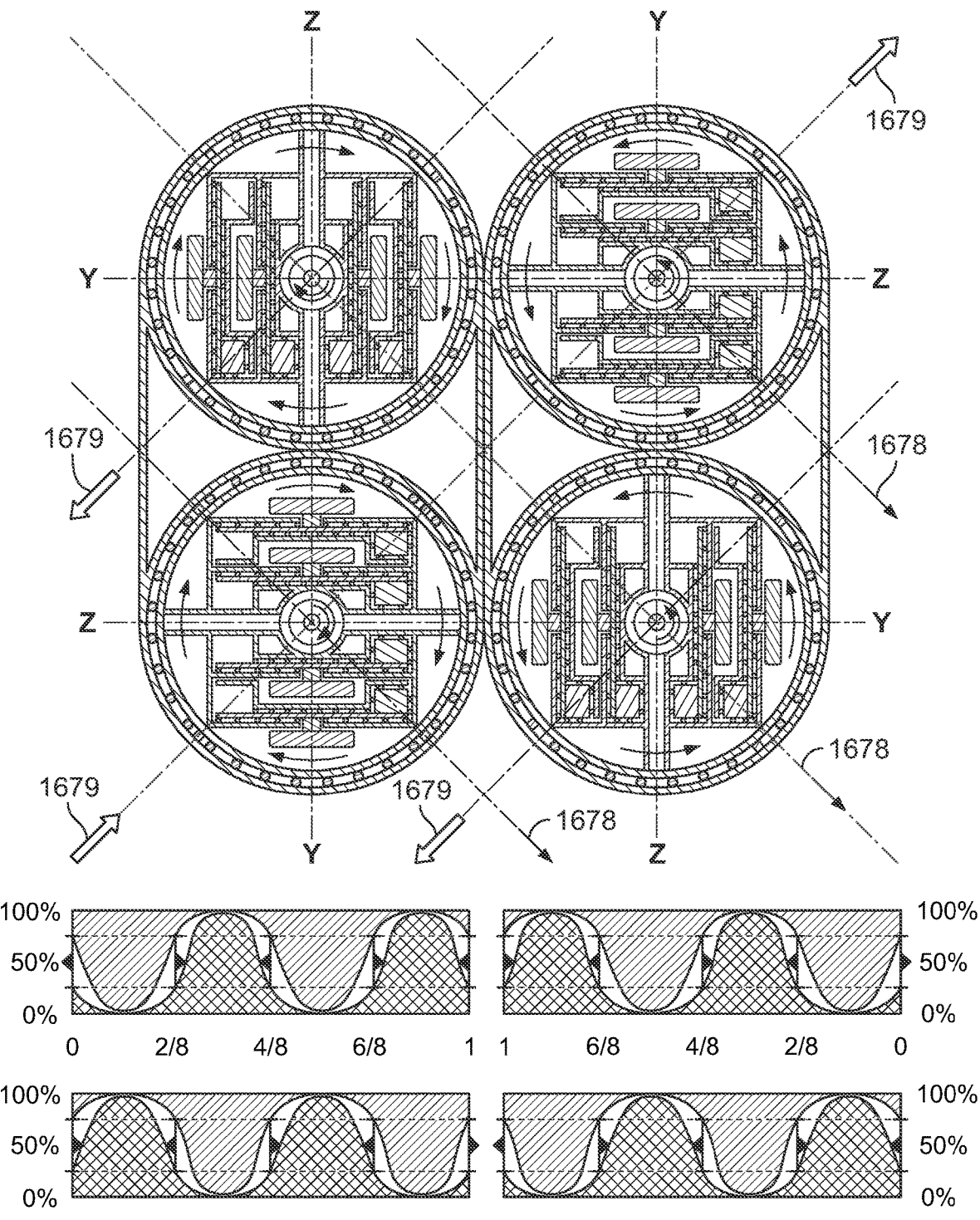
FIGS. 4 and 4A illustrate two of the pair of spherical inner assemblies of FIGS. 2 and 2A apparatus (i.e., four spherical inner assemblies) in a state when the propelling direction is not perpendicular to the imaginary plane containing both parallel centerlines around which the two inner assemblies of one apparatus rotate.
Figure 4A:
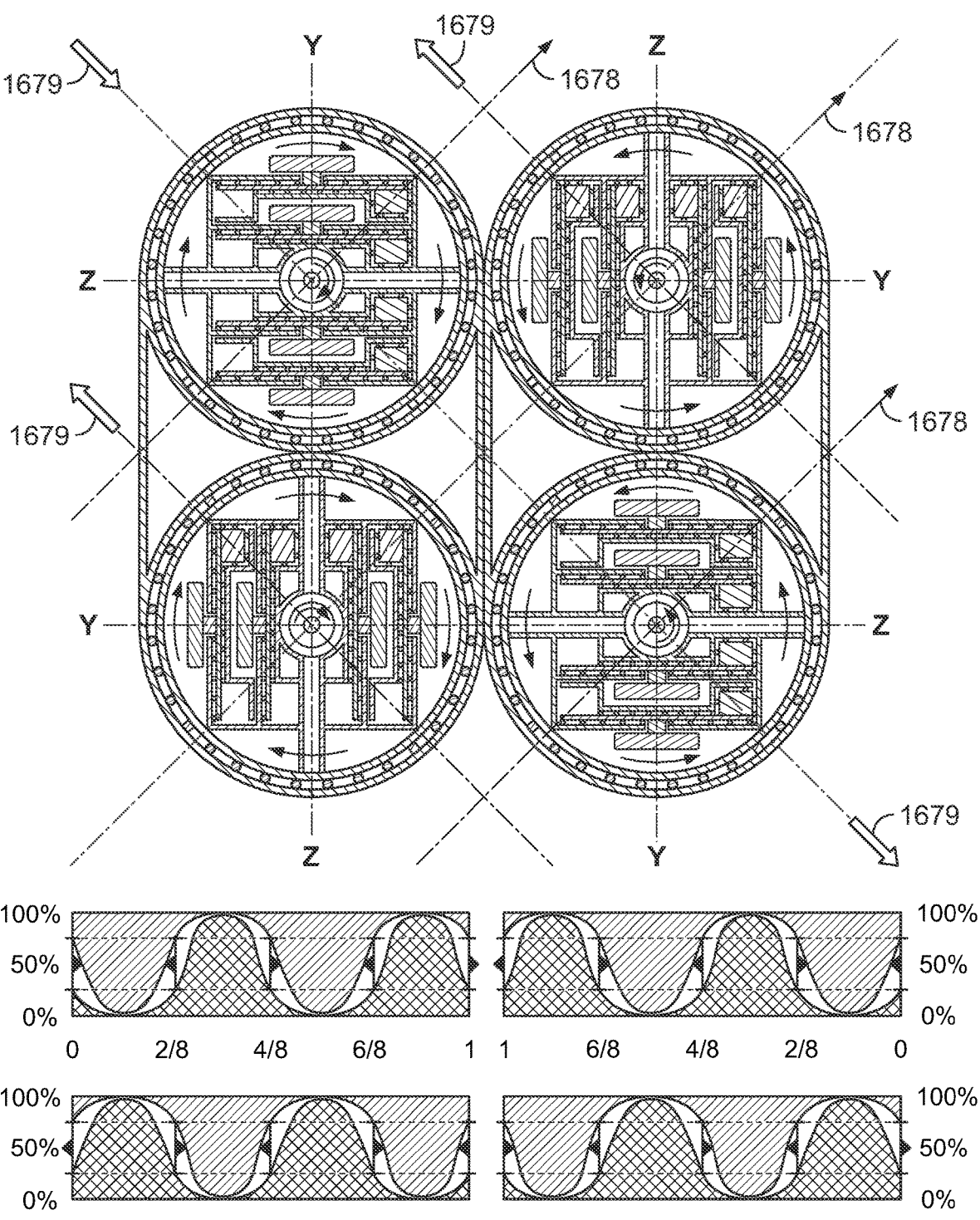
Figure 5:
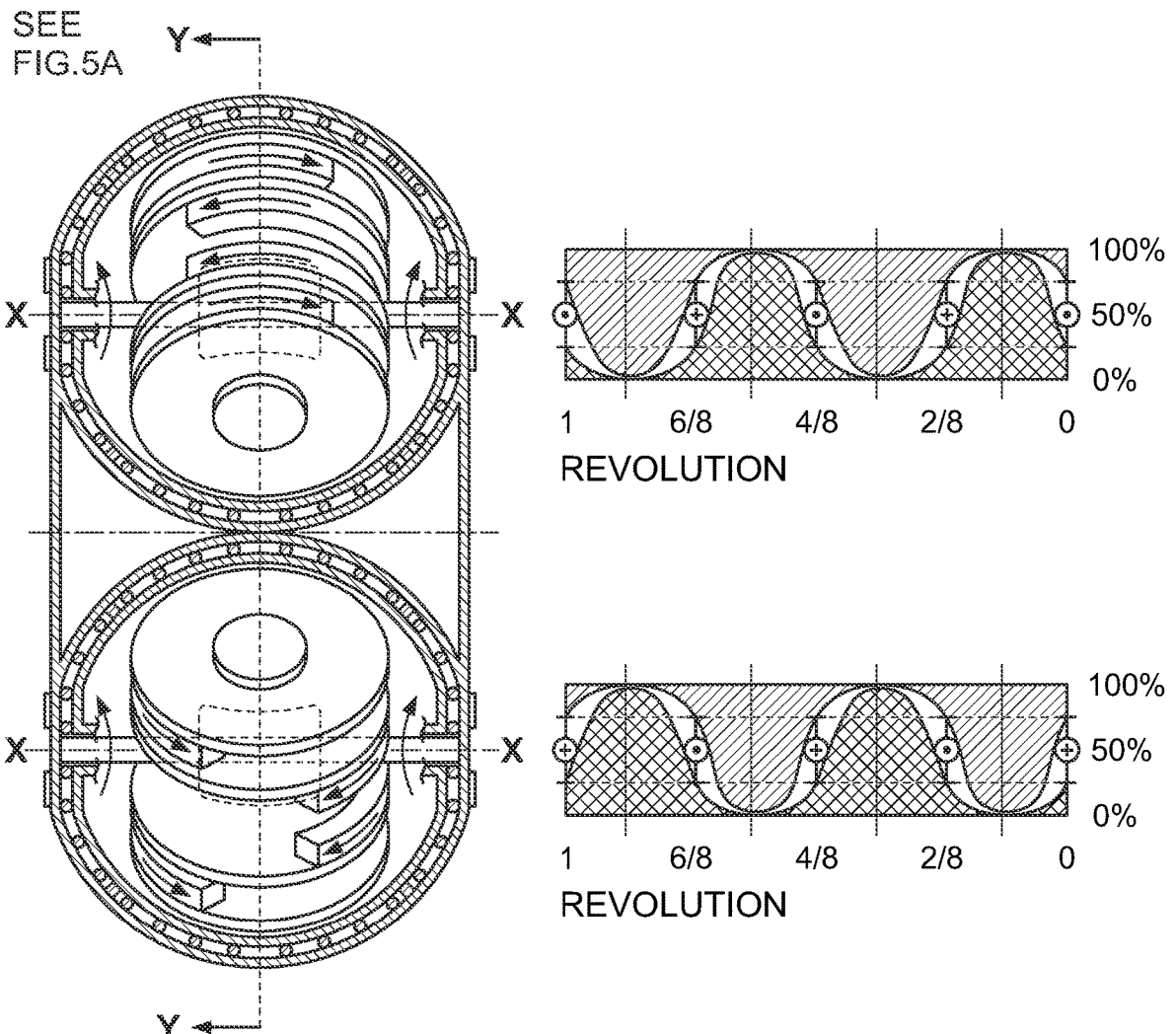
FIGS. 5 and 5A illustrate two of the pair of spherical inner assemblies of FIGS. 2 and 2A apparatus (i.e., four spherical inner assemblies) when the propelling direction is not perpendicular to the imaginary plane containing both centerlines around which the two inner assemblies of one apparatus rotate and is located in the imaginary plane.
Figures 5A, 5B:
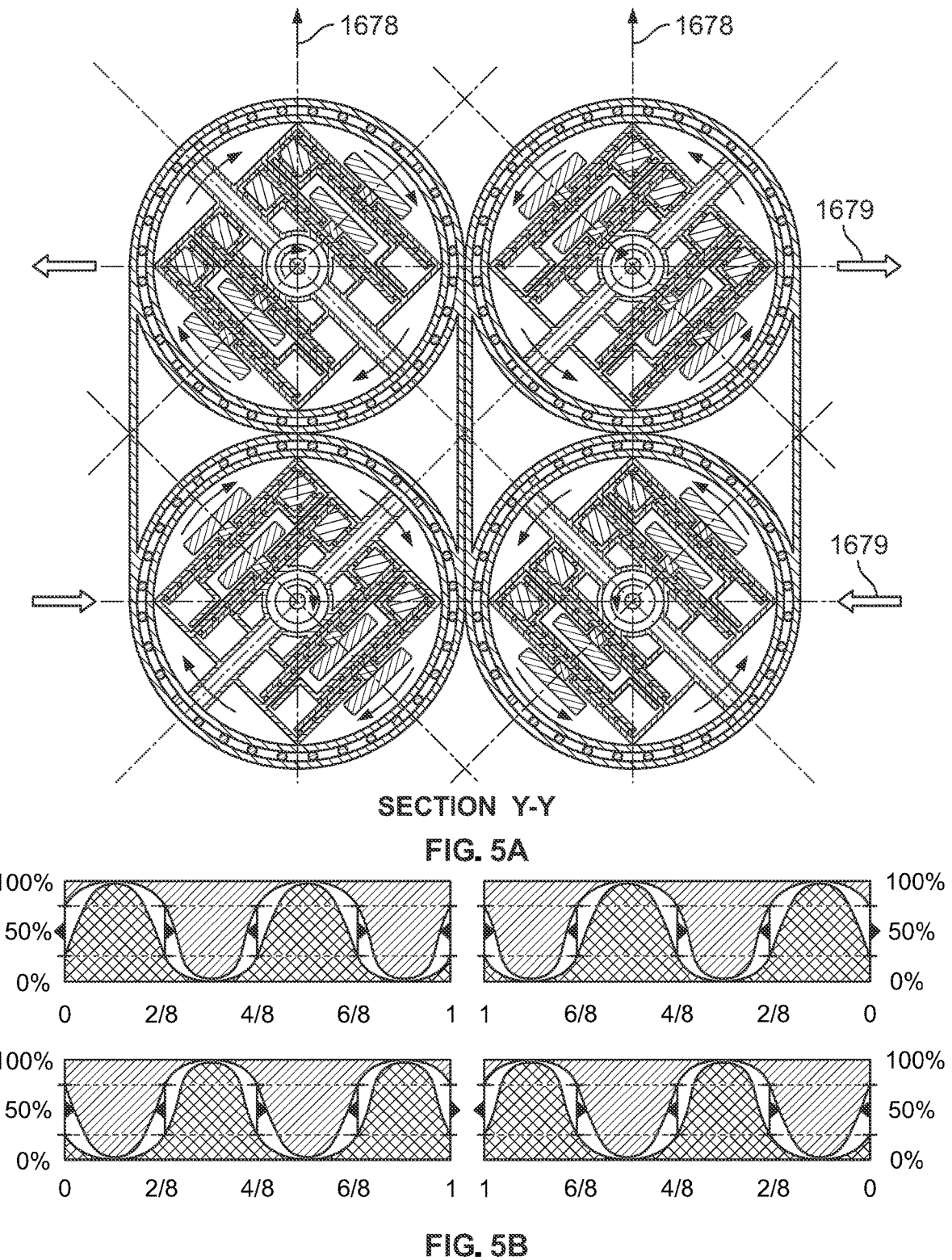
FIG. 5B includes graphical illustrations of centrifugal forces during a revolution of the rotating weights of the pair of spherical inner assemblies.
Figure 6:
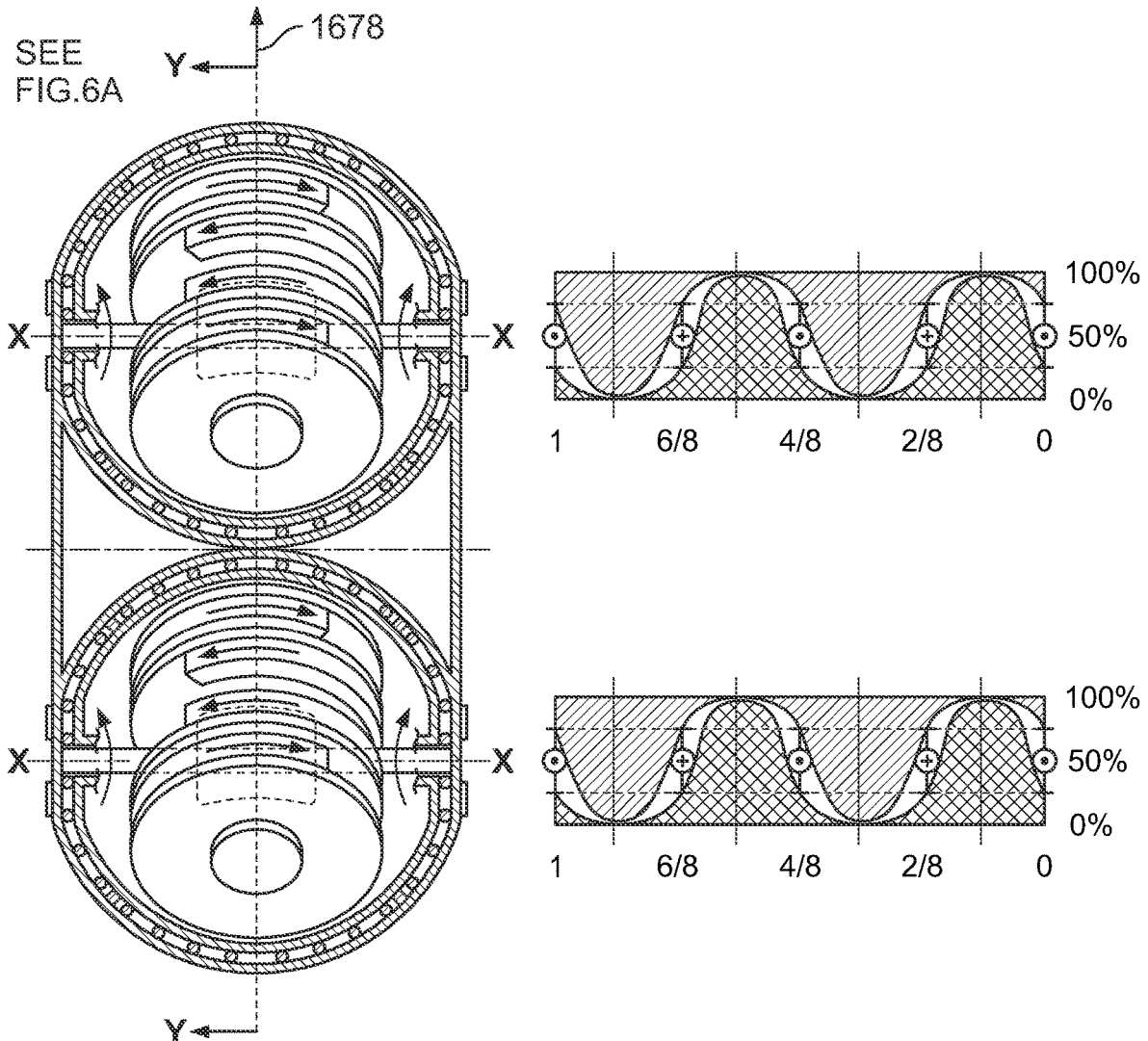
FIGS. 6 and 6A illustrate the four spherical inner assemblies of FIGS. 5 and 5A but where the maximum propelling linear forces of the four (4) inner assemblies are produced simultaneously rather than sequentially.
Figures 6A, 6B:
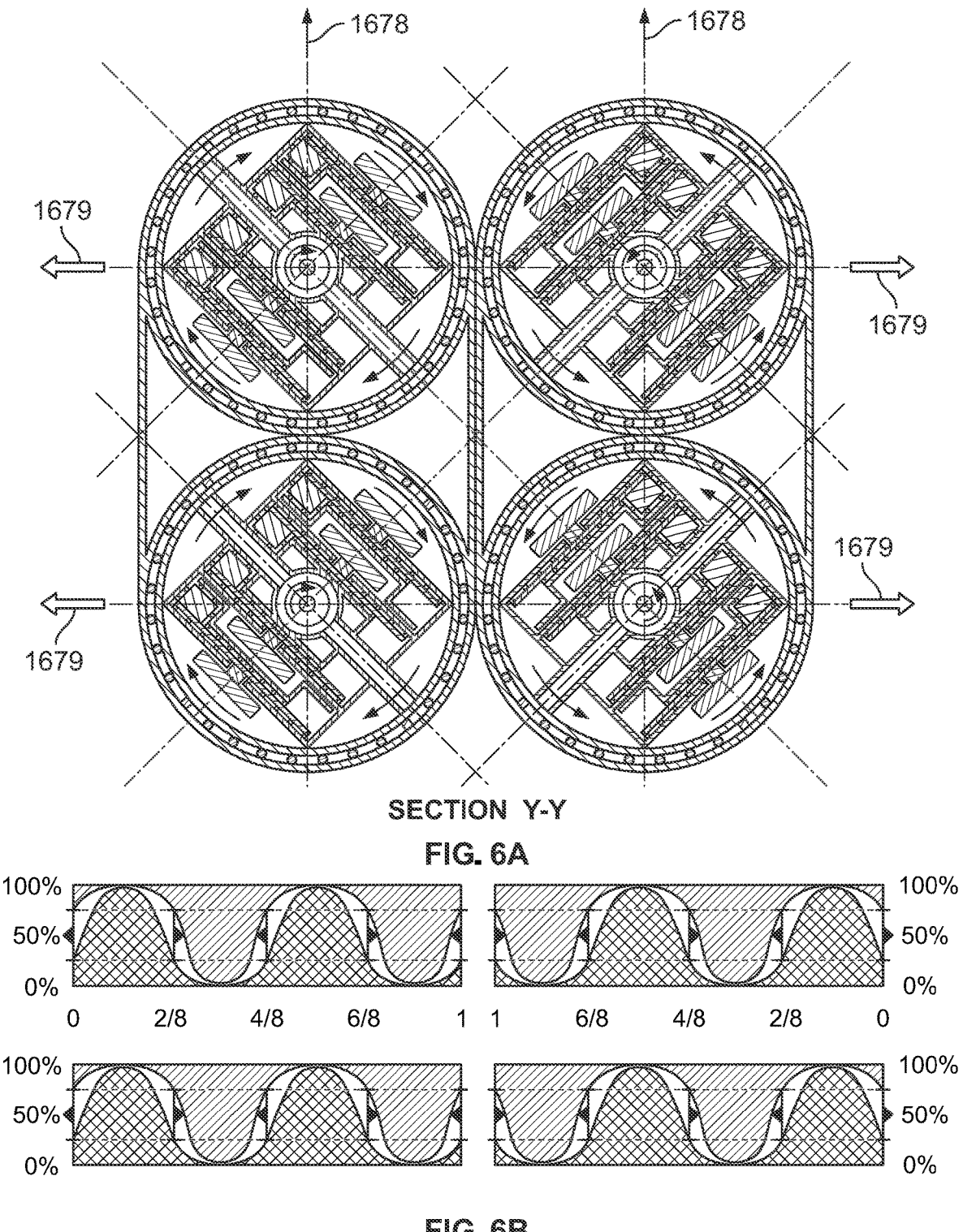
FIG. 6B includes graphical illustrations of centrifugal forces during a revolution of the rotating weights of the pair of spherical inner assemblies.

This embodiment of FIG. 2 (and similarly FIGS. 2A, 3, 3A) shows two assemblies to cancel all vibrating forces when the direction of propulsion is perpendicular to an imaginary plane where both parallel stationary X axes, lie and around each one, its inner assembly rotates. FIG. 2A includes charts where portions 201 indicate opposed cancelled radial centrifugal forces due to rotating weights causing energy loss, and portions 204 indicate unopposed radial centrifugal forces perpendicular to propelling direction causing vibration to be eliminated by combining multiple spherical assemblies when coordinating their rotating directions. Further, portions 208 indicate propelling radial centrifugal forces during a revolution of the rotating weights. FIGS. 4, 4A, 5, 5A, 5B, 6, 6A, and 6B illustrate four assemblies.

When centrifugal forces propel vehicles on the ground and the assemblies are located within the propelled vehicle, other means such as by a spherical assembly as described herein with respect to FIG. 2 that doesn't touch the ground, or inflated spherical tires or railroad wheels can be used to touch the ground and keep the spherical assembly from the ground, may be employed.

The embodiments herein may employ an electric motor 1620 of suitable rotating torque, speed and direction (radial flux motor is shown) to rotate the inner assembly 1630.

Sharp turns in a third direction may be provided by the mechanical design of the attachment of the two spherical assemblies embodiment to the propelled vehicle 1650 (not shown).

The spherical inner assembly 1630 rotates around the stationary X axis by its own motor 1620. Each of its centrifugal force generating weights, 1602 and 1604 and the oppositely rotating 1606 and 1608, rotate by its own reversible variable speed electric motor 1622, 1624, 1626 and 1628 respectively (axial flux type is shown). The weights rotate at controlled speed that always follow and match that of the inner assembly unless interrupted to change the direction of propulsion. The position in rotation of each of the associated inner assemblies can be controlled to be one quarter (¼) revolution lagging behind the other.

The configuration of the inner assembly and all its equal rotating weights at equal radius and their combined rotation can be such that the center of gravity CG of the oppositely rotating weights always coincide in the forward half of the spherical assembly. The configuration of the oppositely rotating weights can be such that the resultants of their created radial centrifugal forces always pass through the geometric center of the inner assembly. Circular plates 1612, 1614, 1616 and 1618 can connect each weight to its rotating motor shaft respectively.

The rotor shaft 1621 of the electric motor 1620 is positioned along the X axis, solidly fixed on both sides to the stationary outer assembly 1640 and positioned such that its center coincide with that of the spherical assembly. The 1620 motor stator is connected to the inner assembly and rotates around the X axis. The outer assembly tendency to rotate by the 1620 rotor is prevented by the equal and opposite tendency to rotate the outer assembly of the solidly connected associated assembly. To eliminate the vibration (see FIG. 2A), the position of the associated second inner assembly 1630 can be controlled for lagging quarter (¼) cycle as shown.

The Detail shows wired electric power supply and wired electric control supply and feedback between the assembly and its power source and instruments in the propelled vehicle. It can be provided by suitable pressure contacts 1642 connected to exterior wiring 1644 and attached to, and electrically insulated from, the stationary outer assembly 1640 and by circular contacts 1632 connected to the interior wiring 1634 and attached to and insulated from the rotating inner assembly 1630, all as close as possible to the X-axis.

The stationary exterior wiring 1644 can be connected to the electric power source and control instruments. The rotating interior wiring 1634 within the inner assembly can provide electric power and control to and from the inner assembly electric motors 1622, 1624, 1626 and 1628 (e.g., such as for and vacuum and temperature sensing feedback). Further, a control and feedback wiring of pressure sensors/mechanical breaks 1636 may be located between the inner assemblies and the outer enclosure. The electric motors (axial flux type shown) 1622, 1624, 1626 and 1628 are connected to the inner assembly and rotate the circular plates 1612, 1614, 1616 and 1618 holding the weights 1602, 1604, 1606 and 1608 respectively.

All moving surfaces within the inner assembly 1630 and between it and the outer enclosure 1640 can be provided with friction reducers 710 and vacuum suitable lubricant with cooling system.

In FIG. 2, arrows 1678 indicate a direction of propelling centrifugal forces, while arrows 1679 indicate a direction of unopposed centrifugal forces, which may cause vibration.

Figure 7:
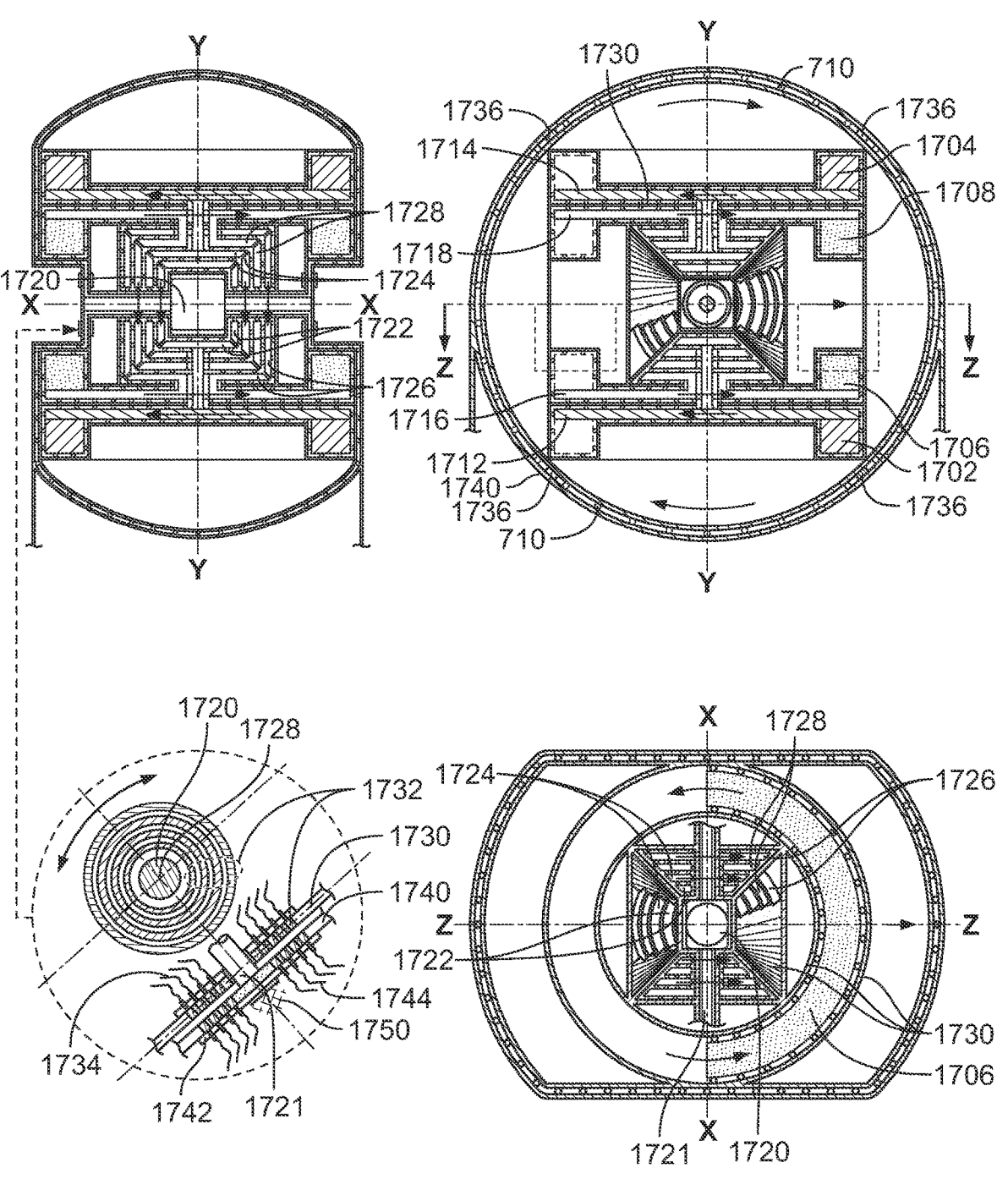
FIG. 7 illustrates an apparatus with a spherical inner assembly enclosed in a stationary sealed under vacuum outer enclosure.

FIG. 7 illustrates another embodiment of the totally wired electric power and control spherical assembly where the electric motor that rotates the inner assembly can also rotate its weights through a set of suitable mechanical gears. The motor 1720 can be of suitable rotating torque, speed and direction (radial flux motor is shown). Each inner assembly frame and its associated weights 1702, 1704, 1706, 1708 are of the same configuration as those of FIGS. 2 and 2A to maintain the stationary state of the outer enclosure (first objective) and at the same time eliminate all vibration causing forces (second objective) resulted from converting the generated radial centrifugal forces to controlled propelling linear forces in magnitude but not direction. For example, weights 1702, 1704 rotate in one direction, and weights 1706, 1708 rotate in an opposite direction.

Here, the inner assembly's rotating motor rotates its weights at the same speed through a set of mechanical gears 1722, 1724, 1726 and 1728 such that the oppositely rotating weights can always coincide in the forward half of the spherical assembly. The direction of propulsion is fixed to the orientation of the propelled vehicle. It cannot be changed by creating momentary change of rotating speeds neither between the oppositely rotating weights nor between them and the inner assembly rotating speed.

Four (4) sets of gears 1722, 1724, 1726 and 1728 concentrically located within the inner assembly around its electric motor 1720. Each set consists of four (4) equal diameter gears engaged perpendicular to each other with one of the gears, in each set, connected to the inner assembly and driven to rotate around the X-axis and a second gear, in each set, connected to rotate its corresponding circular plates 1712, 1714 and the oppositely rotating 1716 and 1718 and each holding its corresponding rotating weight 1702, 1704, 1706 and 1708 respectively.

All rotating parts within the inner assembly and between it and the outer enclosure can have friction reducers 710 ball bearings in lubricant. Lubricant pump (not shown), located between the inner assembly and the outer enclosure and attached to the stationary shaft 1720 can have its lubricant inlet and outlet to an outside lubricant cooler in the centerline X axis 1721.

The use of mechanical gears to rotate the weights can reduce and limit their maximum rotating speed and reduce cost. It can be an attractive candid for proof of concept proto type.

The configuration of the inner assembly and all its equal rotating weights at equal radius and their combined rotation can be such that the center of gravity CG of the oppositely rotating weights can always coincide in the forward half of the spherical assembly.

The configuration of the oppositely rotating weights can be such that the resultants of their created radial centrifugal forces always pass through the inner assembly geometric center, thereby cancelling out any created angular momentum.

The speed of rotation of the inner assembly and its oppositely rotating weights can be mechanically the same. No Momentary difference between them is possible. While the propulsion magnitude can be changed (by changing the speed of the motor 1720), its direction cannot be changed.

Change of the direction of propulsion is only possible by the design of the attachment 1750 (not shown) to the propelled vehicle.

Change of the direction of travel of a vehicle can be accomplished by creating torque in the horizontal and in the vertical planes between two embodiments in each and attached to the vehicle at a distance. Creating a difference in the amount of propulsion between the two, by manipulating their speed of rotation, can produce the torque needed to change travel direction and vehicle orientation.

Pressure sensors 1736 can be located between the inner assembly 1730 and its outer enclosure 1740 and can provide steering feedback control signals.

The rotor shaft 1721 of the electric motor 1720 is positioned along the X axis, solidly fixed on both sides to the stationary outer assembly 1740 and positioned such that its center coincide with that of the spherical assembly. The 1720 motor stator is connected to the inner assembly and rotates around the X axis. The outer enclosure tendency to rotate by the 1720 shaft is counteracted by the equal and opposite tendency to rotate the outer assembly of the solidly connected associated second assembly. To eliminate the vibration (see FIG. 2A), the position of the associated second inner assembly 1730 can be positioned for lagging quarter (¼) cycle.

FIG. 7 shows wired electric power supply and wired electric control supply and feed back to and from the assembly. It can be provided by suitable pressure contacts 1742 connected to exterior wiring 1744 and attached to, and electrically insulated from, the stationary outer enclosure 1740 and by circular contacts 1732 connected to the interior wiring 1734 and attached to, and electrically insulated from, the rotating inner assembly 1730, all as close as possible to the stationary X-axis.

The stationary exterior wiring 1744 can be connected to the electric power source and control equipment located outside the assemblies (possibly in the propelled vehicle). The rotating interior wiring 1734 within the inner assembly can provide electric power and control to and from the inner assembly electric motor 1720 (e.g., such as for vacuum and temperature sensing feedback) and to and from the control pressure sensors/mechanical brakes 1736, which may be strategically located between the inner assemblies and the outer enclosure.

All moving surfaces within the inner assembly 1730 and between it and the outer enclosure 1740 can be provided with friction reducers 710 and lubricant with cooling system. The totally enclosed outer enclosure 1740 can be maintained under vacuum to eliminate or at least reduce heat due to air friction.

In some examples, the embodiment of FIG. 7 may include a second connected (e.g., identical) spherical assembly to maintain the stationary state of the outer enclosure by counteract the motor 1720 shaft tendency to rotate and also to eliminate all unopposed vibration causing forces resulted during the conversion process of the generated radial centrifugal forces to controlled propelling linear forces in magnitude but not direction. The position of the inner assembly of one of the associated assemblies can be positioned to be one quarter (¼) revolution lagging behind the other.

In some embodiments, a spherical assembly for vehicle propulsion (e.g., on the ground, in the air, or space, or water) utilizing and manipulating natural vertical gravitational forces comprises: a propelled vehicle frame; a stationary solid spherical outer enclosure connected at its top pole to the propelled vehicle frame by pivoted connection allowing its movement around its vertical centerline through springs and shock absorbers and partially concentrically encasing; a sealed spherical inner assembly touching the ground and allowed to rotate around a fixed stationary centerline connected to the stationary outer enclosure and comprising: a first electric motor connected to a first unbalancing weight and to the spherical inner assembly; a second electric motor connected to a second unbalancing weight and to the spherical inner assembly; a third electric motor connected to a third unbalancing weight and to the spherical inner assembly; and a fourth electric motor connected to a fourth unbalancing weight and to the spherical inner assembly, wherein said first weight, the second weight, the third weight and the fourth weight may be identical in shape, equal in weight, and their centers of gravity rotate at equal radii; and a controller in the propelled vehicle, operatively coupled to the first motor, the second motor, the third motor, and the fourth motor, and configured to: cause the first motor to rotate the first weight in a first direction at a first rotational speed based on a rotational speed of the spherical inner assembly; cause the second motor to rotate the second weight in the first direction at the first rotational speed; cause the third motor to rotate the third weight in a second direction at a second rotational speed based on a rotational speed of the spherical inner assembly; cause the fourth motor to rotate the fourth weight in the second direction at the second rotational speed; cause the first and second rotational speeds to be the rotational speed of the inner assembly wherein all the weights are configured and arranged such that their centers of gravity remain in only the forward one half of the spherical inner assembly in spite of its rotation; cause the first motor and the second motor to rotate the first weight and the second weight such that the first weight and the second weight simultaneously provide a greatest moment of gravitational force to a point along the fixed center line of rotation of the spherical inner assembly simultaneous to when the controller causes the third motor and the fourth motor to rotate the third weight and the fourth weight to simultaneously provide a greatest moment of gravitational force to a point along the fixed center line of rotation of the spherical inner assembly causing it to rotate at the maximum speed of rotation that the gravitational forces, acting upon the weights, can provide.

In some examples, the controller causes the first rotational speed and the second rotational speed to simultaneously change momentarily in relation to the rotating speed of the spherical inner assembly to reduce the moment of the gravitational force by reducing its arm length. Repeats of the momentary change can eventually transfer the propelling moments of the gravitational forces to the backward half of the spherical inner assembly propelling the vehicle backward or reducing its skid distance upon breaking to stop. In some examples, the controller causes the first rotational speed to change momentarily in relation to the second rotational speed producing soft turns to change a direction of travel of the spherical assembly.

In some examples, the spherical assembly includes a friction reducer configured to minimize friction between the rotating spherical inner assembly and the stationary spherical outer enclosure and between the rotating weights and the totally sealed spherical inner assembly frame and consist of at least one ball bearing. The friction reducer in the rotating sealed spherical inner assembly includes lubricant and a lubricant pump, filters, and coolant located in the propelled vehicle and connected to the spherical inner assembly at the two center connections of its stationary axis of rotation to the stationary outer spherical enclosure.

In some examples, the two connections of the stationary axis of rotation of the spherical inner assembly to the outer spherical enclosure include all electric power and control wiring connections between the spherical inner assembly and the remote electric power source and control equipment located in the propelled vehicle.

In some examples, electrically or pneumatically operated mechanical breaks and pressure sensors can be located between the spherical outer enclosure and outer surface of the sealed spherical inner assembly and connected to their controlling apparatuses in the propelled vehicle.

In some examples, the said pivoted connection of the spherical outer enclosure to the propelled vehicle is provided with an electric or pneumatic servo motor to actuate an immediate sharp turn of the travel direction without changing the orientation of the propelled vehicle.

In some examples, the said spherical inner assembly comprises an electric motor-generator set physically connected to the spherical inner assembly frame and to its stationary axis of rotation that connect to the stationary spherical outer enclosure.

In some examples, the controller in the propelled vehicle is operatively coupled to the motor-generator and configured to: cause the motor-generator set to operate as a generator as it rotates with the spherical inner assembly frame to generate a measured and controlled electric current charging the remote electric power source (batteries). The amount of the generated electric current can manipulate the otherwise constant propelling gravitational force to control the otherwise constant speed of travel of the propelled vehicle. The controller may also cause the motor-generator set to operate as a motor to increase the rotating speed of the spherical inner assembly more than that what the constant gravitational forces can provide. The rotating speed increase however, can be limited to less than that which can generate prevailing centrifugal forces over the gravitational forces of the rotating weights in the spherical inner assembly.

In some examples, a spherical assembly comprises: a stationary solid totally sealed, under absolute vacuum, spherical outer enclosure attached to the propelled vehicle frame and concentrically encasing; a spherical inner assembly allowed to rotate around a fixed stationary centerline connected to the stationary outer enclosure and comprising: a first electric motor connected to a first unbalancing weight and to the spherical inner assembly; a second electric motor connected to a second unbalancing weight and to the spherical inner assembly; a third electric motor connected to a third unbalancing weight and to the spherical inner assembly; a fourth electric motor connected to a fourth unbalancing weight and to the spherical inner assembly, wherein said first weight, the second weight, the third weight and the fourth weight may be identical in shape, equal in weight and their centers of gravity rotate at equal radii; and a fifth electric motor connected to the spherical inner assembly and to its stationary fixed rotating axis which connect to the stationary sealed spherical outer enclosure at its two ends; and a controller in the propelled vehicle, operatively coupled to the first motor, the second motor, the third motor, the fourth motor and the fifth motor, and configured to: cause the first motor to rotate the first weight in a first direction at a first rotational speed based on a rotational speed of the spherical inner assembly; cause the second motor to rotate the second weight in the first direction at the first rotational speed; cause the third motor to rotate the third weight in a second direction at a second rotational speed based on a rotational speed of the spherical inner assembly; cause the fourth motor to rotate the fourth weight in the second direction at the second rotational speed; and cause the fifth motor to rotate the spherical inner assembly in a third direction at a third rotational speed.

In some examples, at relatively low rotating speeds at the start when natural gravitational forces prevail over any created centrifugal forces, the controller is configured to: cause the first and second rotational speeds to be the third rotational speed of the spherical inner assembly wherein all the weights are configured and arranged such that their centers of gravity remain in only the forward half of the spherical inner assembly in spite of its rotation; and cause the first motor and the second motor to rotate the first weight and the second weight such that the first weight and the second weight simultaneously provide a greatest moment of gravitational force to a point along the fixed center line of rotation of the spherical inner assembly simultaneous to when the controller causes the third motor and the fourth motor to rotate the third weight and the fourth weight to simultaneously provide a greatest moment of gravitational force to a point along the fixed center line of rotation of the spherical inner assembly.

In some examples, at relatively high rotating speeds of operation when the created centrifugal forces prevail over the natural gravitational forces acting on the rotating weights, the controller is configured to: cause the first and second rotational speeds to be the third rotational speed of the spherical inner assembly wherein all the weights are configured and arranged such that the resultants of their created radial centrifugal forces always pass through the geometric center of the spherical assembly and always emanate from only the forward half of the spherical inner assembly in spite of its rotation; and cause the first motor and the second motor to rotate the first weight and the second weight such that the first weight and the second weight simultaneously generate the greatest resultant of their created radial centrifugal forces in the direction of propulsion that passes through the geometric center of the spherical assembly simultaneous to when the controller causes the third motor and the fourth motor to rotate the third weight and the fourth weight simultaneously generate the greatest resultant of created radial centrifugal forces in the direction of propulsion that passes through the geometric center of the spherical assembly.

In some examples, the controller is configured to cause the first rotational speed and the second rotational speed to simultaneously change momentarily in relation to the third rotating speed to change the direction of the propulsion vector within the imaginary plane containing it and perpendicular to the center line of rotation of the spherical inner assembly.

In some examples, the controller is configured to cause the first rotational speed to change momentarily in relation to the second and third rotational speeds or cause the second rotational speed in relation to the first and third rotational speeds to change the direction of the propulsion vector within the imaginary plane containing it and the center line of rotation of the spherical inner assembly.

In some examples, the spherical assembly includes a friction reducer configured to minimize friction between the rotating spherical inner assembly and the stationary, totally sealed, under absolute vacuum, spherical outer enclosure and between the rotating weights and the spherical inner assembly frame and consist of at least one ball bearing and vacuum pump. The friction reducer may include lubricant and remote lubricant pump, filters, and coolant located in the propelled vehicle and connected to the stationary spherical outer enclosure at the two connections of the axis of rotation of its spherical inner assembly.

In some examples, the two connections of the axis of rotation of the spherical inner assembly to the stationary spherical outer enclosure can also include all electric power and control wiring connections between the spherical assembly and the remote electric power source and control equipment located in the propelled vehicle.

In some examples, electrically or pneumatically operated mechanical breaks and pressure sensors are strategically located between the spherical outer enclosure and outer surface of the spherical inner assembly and connected to their controlling apparatuses in the propelled vehicle.

In some examples, said outer enclosure encases a second (e.g., identical) spherical inner assembly and positioned therein such that the centerlines of rotation of both inner assemblies are parallel to each other and solidly connected to the outer enclosure.

In some examples, the said controller is coupled to the second spherical inner assembly in a similar manner as the other. In some examples, when the propelling vector is in a direction perpendicular to the imaginary plane containing both parallel centerlines of rotation of both spherical inner assemblies, the controller is configured to cause the position of one rotating spherical inner assembly to be lagging behind the other by a quarter ($\frac{1}{4}$) of cycle, as both rotate at the same third rotating speed and in the same third direction.

In some examples, multiple spherical assemblies are coupled, oriented and controlled such that: an unopposed component of the created radial centrifugal forces not in the direction of the propelling vector of any spherical assembly and causing vibration can be cancelled by an equal, opposite, on center and unopposed component of another coupled spherical assembly thereby eliminating the source of vibration in both spherical assemblies. In some examples, the combined effect of the third direction of rotation of all coupled spherical inner assemblies can eliminate any tendency to rotate their outer enclosures and maintain their stationary state.

In some examples, the said attachment of the spherical outer enclosure to the propelled vehicle can be by pivoted connections at the upper and lower poles of the spherical outer enclosure allowing its movement around a centerline perpendicular to the centerline of rotation of the enclosed spherical inner assembly and passing through the geometric center of the spherical assembly. The pivoted connections are provided with electric or pneumatic servo motor to actuate an immediate sharp turn of the propulsion vector without changing the orientation of the propelled vehicle.

The controller described herein may include one or more processors and, in some examples, one or more memory devices (e.g., non-volatile memory device, non-transitory computer readable medium). In some examples, the one or more processors execute instructions stored in the one or more memory devices that cause the controller to perform any of the controller operations described herein. In some examples, a method by one or more processors includes any of the operations of the controller described herein. In some examples, one or more memory devices store instructions that, when executed by one or more processors, cause the one or more processors to perform any of the controller operations described herein.

The methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

While preferred embodiments of the present subject matter have been described, it is to be understood that the embodiments described are illustrative only and that the scope of the subject matter is to be defined solely by the appended claims when accorded a full range of equivalence, and the many variations and modifications naturally occurring to those of skill in the art from a perusal hereof.

I claim:

1. A spherical assembly for vehicle propulsion comprising:

a propelled vehicle frame;

a stationary solid spherical outer enclosure connected at its top pole to the propelled vehicle frame by pivoted connection allowing its movement around its vertical centerline through springs and shock absorbers and partially concentrically encasing;

a sealed spherical inner assembly touching the ground and allowed to rotate around a fixed stationary centerline connected to the stationary outer enclosure and comprising:

a first electric motor connected to a first unbalancing weight and to the spherical inner assembly;

a second electric motor connected to a second unbalancing weight and to the spherical inner assembly;

a third electric motor connected to a third unbalancing weight and to the spherical inner assembly; and a fourth electric motor connected to a fourth unbalancing weight and to the spherical inner assembly, wherein said first weight, the second weight, the third weight and the fourth weight are equal in weight, and their centers of gravity rotate at equal radii; and a controller in the propelled vehicle, operatively coupled to the first motor, the second motor, the third motor, and the fourth motor, and configured to:

cause the first motor to rotate the first weight in a first direction at a first rotational speed based on a rotational speed of the spherical inner assembly;

cause the second motor to rotate the second weight in the first direction at the first rotational speed;

cause the third motor to rotate the third weight in a second direction at a second rotational speed based on a rotational speed of the spherical inner assembly;

cause the fourth motor to rotate the fourth weight in the second direction at the second rotational speed;

cause the first and second rotational speeds to be the rotational speed of the inner assembly wherein all the weights are configured and arranged such that their centers of gravity remain in only the forward one half of the spherical inner assembly in spite of its rotation;

cause the first motor and the second motor to rotate the first weight and the second weight such that the first weight and the second weight simultaneously provide a greatest moment of gravitational force to a point along the fixed center line of rotation of the spherical inner assembly simultaneous to when the controller causes the third motor and the fourth motor to rotate the third weight and the fourth weight to simultaneously provide a greatest moment of gravitational force to a point along the fixed center line of rotation of the spherical inner assembly causing it to rotate at the maximum speed of rotation that the gravitational forces, acting upon the weights, can provide.

2. The spherical assembly of claim 1, wherein the controller causes the first rotational speed and the second rotational speed to simultaneously change momentarily in relation to the rotating speed of the spherical inner assembly to reduce the moment of the gravitational force by reducing its arm length.

3. The spherical assembly of claim 2, wherein the controller causes the first rotational speed to change momentarily in relation to the second rotational speed producing soft turns to change a direction of travel of the spherical assembly.

4. The spherical assembly of claim 1 comprising a friction reducer configured to minimize friction between the rotating spherical inner assembly and the stationary spherical outer enclosure and between the rotating weights and the totally sealed spherical inner assembly frame and comprising at least one ball bearing.

5. The spherical assembly of claim 4, wherein the friction reducer in the rotating sealed spherical inner assembly includes lubricant and remote lubricant pump, filters, and coolant located in the propelled vehicle and connected to the spherical inner assembly at the two center connections of its stationary axis of rotation to the stationary outer spherical enclosure.

6. The spherical assembly of claim 4, wherein the two center connections of the stationary axis of rotation of the spherical inner assembly to the outer spherical enclosure include all electric power and control wiring connections between the spherical inner assembly and the remote electric power source and control equipment located in the propelled vehicle.

7. The spherical assembly of claim 1 comprising electrically or pneumatically operated mechanical breaks and pressure sensors located between the spherical outer enclosure and outer surface of the sealed spherical inner assembly and connected to their controlling apparatuses in the propelled vehicle.

8. The spherical assembly of claim 1 wherein the pivoted connection of the spherical outer enclosure to the propelled vehicle is provided with an electric or pneumatic servo motor to actuate an immediate sharp turn of the travel direction without changing the orientation of the propelled vehicle.

9. The spherical assembly of claim 1 wherein the spherical inner assembly comprises an electric motor-generator set physically connected to the spherical inner assembly frame and to its stationary axis of rotation that connect to the stationary spherical outer enclosure.

10. A spherical assembly comprising:

a spherical outer enclosure attached to a propelled vehicle frame and a concentrically encasing;

a spherical inner assembly allowed to rotate around a fixed stationary centerline connected to the outer enclosure and comprising:

a first electric motor connected to a first unbalancing weight and to the spherical inner assembly;

a second electric motor connected to a second unbalancing weight and to the spherical inner assembly;

a third electric motor connected to a third unbalancing weight and to the spherical inner assembly;

a fourth electric motor connected to a fourth unbalancing weight and to the spherical inner assembly, wherein said first weight, the second weight, the third weight and the fourth weight are equal in weight, and their centers of gravity rotate at equal radii; and a fifth electric motor connected to the spherical inner assembly and to its stationary fixed rotating axis which connect to the spherical outer enclosure at its two ends; and a controller in the propelled vehicle, operatively coupled to the first motor, the second motor, the third motor, the fourth motor and the fifth motor, and configured to:

cause the first motor to rotate the first weight in a first direction at a first rotational speed based on a rotational speed of the spherical inner assembly;

cause the second motor to rotate the second weight in the first direction at the first rotational speed;

cause the third motor to rotate the third weight in a second direction at a second rotational speed based on a rotational speed of the spherical inner assembly;

cause the fourth motor to rotate the fourth weight in the second direction at the second rotational speed; and cause the fifth motor to rotate the spherical inner assembly in a third direction at a third rotational speed.

11. The spherical assembly of claim 10, wherein the controller causes the first and second rotational speeds to be the third rotational speed of the spherical inner assembly and wherein the first unbalancing weight, the second unbalancing weight, the third unbalancing weight and the fourth unbalancing weight are configured and arranged such that their centers of gravity remain in the forward half of the spherical inner assembly and their created radial forces pass through the geometric center of the spherical assembly despite of its rotation.

12. The spherical assembly of claim 11, wherein the controller causes the first rotational speed and the second rotational speed to change in relation to the third rotational speed to change a direction of travel of the spherical assembly, and/or causes the first rotational speed to change momentarily in relation to the second rotational speed (and the third rotational speed) producing soft turns to change vehicle travel direction without changing its orientation . . .

13. The spherical assembly of claim 10 comprising a friction reducer configured to minimize friction between the spherical inner assembly and the spherical outer enclosure.

14. The spherical assembly of claim 13, wherein the friction reducer in the spherical inner assembly includes lubricant, a remote lubricant pump, remote filters, and remote coolant connected to the spherical inner assembly at two center connections of its stationary axis of rotation to the spherical outer enclosure.

15. The spherical assembly of claim 14, wherein the two center connections of the stationary axis of rotation of the spherical inner assembly to the spherical outer enclosure include all electric power and control wiring connections between the spherical inner assembly and a remote electric power source and control equipment located remote from the spherical assembly.

16. The spherical assembly of claim 10, wherein the spherical inner assembly is a first spherical inner assembly and the outer enclosure further encases a second spherical inner assembly positioned therein such that a centerline of rotation of the second spherical inner assembly is parallel to the centerline of rotation of the first spherical inner assembly.

17. The spherical assembly of claim 10 comprising electrically or pneumatically operated mechanical breaks and pressure sensors located between the spherical outer enclosure and an outer surface of the spherical inner assembly.

18. A method of propelling a vehicle comprising:
providing the spherical assembly of claim 9;
causing the electric motor-generator set to rotate or be rotated in a third direction at a controllable third rotational speed that otherwise is constant; and
causing the first and second rotational speeds to be the third rotation speed wherein the first weight, the second weight, the third weight, the fourth weight and the inner assembly, their rotation directions and instantaneous positions are arranged and configured such that the centers of gravity of the unbalancing weights always remain on one selected forward half of the spherical inner assembly despite its rotation.

19. A method of propelling comprising:
providing the spherical assembly of claim 16; and
controlling the first inner assembly and the second inner assembly to maintain a stationary state of the outer enclosure and eliminate vibrations.

20. The method of claim 19 further comprising:
providing a second spherical assembly of claim 16; and wherein
the spherical inner assemblies of the second spherical assembly rotate in directions and speeds to counter act and neutralize the developed torque created by the first spherical assembly when the propelling direction is not perpendicular to the centerline connecting the geometric centers of the two respective inner spherical assemblies, and the rotation directions and speeds of the inner assemblies of the first and second spherical assemblies is selected to counter act and neutralize the torques developed by created off center angular momentums of the rotating inner assembly frames.

* * * * *